United States Patent
Okuno (10) Patent No.: US 7,280,759 B2
(45) Date of Patent: Oct. 9, 2007

(54) OPTICAL TRANSMISSION SYSTEM, OPTICAL MULTIPLEXER, AND OPTICAL DEMULTIPLEXER

(75) Inventor: Toshiaki Okuno, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 621 days.

(21) Appl. No.: 10/671,794

(22) Filed: Sep. 29, 2003

(65) Prior Publication Data

US 2004/0091266 A1 May 13, 2004

(30) Foreign Application Priority Data

Oct. 24, 2002 (JP) ............... 2002-309852

(51) Int. Cl.
- H04B 10/08 (2006.01)
- H04B 10/12 (2006.01)
- H04B 10/04 (2006.01)
- H04B 10/00 (2006.01)
- H04J 14/02 (2006.01)

(52) U.S. Cl. ............... 398/81; 398/38; 398/95; 398/159; 398/147; 398/197

(58) Field of Classification Search ............ 398/25–29, 398/34, 37, 38, 79, 81, 94, 95, 158–160, 398/147, 196, 197
See application file for complete search history.

(56) References Cited

U.S. PATENT DOCUMENTS 6,275,632 B1 * 8/2001 Waarts et al. ................. 385/37
6,400,498 B1 * 6/2002 Shimomura et al. ..... 359/341.1
2002/0168160 A1 * 11/2002 Hirano et al. ............... 385/123
2003/0076578 A1 * 4/2003 Goto et al. ............. 359/337.4

FOREIGN PATENT DOCUMENTS

| EP | 0 991 217 A2 | 4/2000 |
|---|---|---|
| JP | 63-030030 | 2/1988 |
| JP | 10-173597 | 6/1998 |
| JP | 11-275020 | 10/1999 |
| JP | 2000-156702 | 6/2000 |
| JP | 2002-204207 | 7/2002 |

OTHER PUBLICATIONS

JP Office Action issued in Patent Appln. No. 2002-309852, dated Jun. 5, 2007 with English translation.

* cited by examiner

*Primary Examiner*—Dalzid Singh
(74) *Attorney, Agent, or Firm*—McDermott Will & Emery LLP (57) ABSTRACT

An optical transmission system capable of transmitting with high quality all the component signals of a signal lightwave having a broad total wavelength band and particularly suitable for the CWDM optical transmission, and an optical multiplexer and an optical demultiplexer for the system. Component signals outputted from optical transmitters are combined by an optical multiplexer, travel over an optical fiber transmission line, and arrive at an optical demultiplexer to be separated. They are received by optical receivers. The total transmission loss in the transmission line is smaller at wavelength $\lambda_b$ than at wavelength $\lambda_a$. The insertion loss of the optical multiplexer or the optical receiver is larger at wavelength $\lambda_b$ than at wavelength $\lambda_a$. The difference in power between the component signals having wavelengths $\lambda_a$ and $\lambda_b$ arriving at the optical receivers is smaller than the difference in the total transmission loss in the transmission line between wavelengths $\lambda_a$ and $\lambda_b$.

13 Claims, 5 Drawing Sheets

OPTICAL TRANSMISSION SYSTEM, OPTICAL MULTIPLEXER, AND OPTICAL DEMULTIPLEXER

BACKGROUND OF THE INVENTION

1. Field of the Invention

The present invention relates to an optical transmission system that transmits a signal lightwave comprising a plurality of component signals each having a different wavelength, an optical multiplexer for combining component signals each having a different wavelength to constitute a signal lightwave, and an optical demultiplexer for separating a plurality of component, signals each having a different wavelength from a signal lightwave.

2. Description of the Background Art

The wavelength division multiplexing (WDM) optical transmission system multiplexes a plurality of component signals to transmit them over one optical fiber transmission line. The WDM optical transmission system can transmit and receive a large volume of information over one optical fiber. For trunk-line optical transmission systems for which communication demands are booming, researchers and engineers are studying to increase the transmission capacity further by increasing the degree of multiplexing through the narrowing of the wavelength spacing of the component signals. A WDM transmission system having a high degree of multiplexing is known as a dense WDM (DWDM) system.

Published Japanese patent application 2000-156702 (corresponding published European patent application: EP 0991217A2) has disclosed an invention that relates to a low-cost WDM system having a wide wavelength spacing of the component signals. Such a system is called a coarse WDM (CWDM) system, which is usually used for a relatively low volume of communication traffic. The CWDM optical transmission system has a small number of optical parts, such as signal light sources and light-receiving devices, because it has a small number of component signals. Its wide wavelength spacing of the component signals enables the use of low-cost optical parts, such as optical multiplexers and optical demultiplexers, having low wavelength precision. As a result, a low-cost system can be constructed.

In the CWDM optical transmission system, however, the wide wavelength spacing of the component signals broadens the total wavelength band of a signal lightwave comprising a plurality of component signals. The band width is sometimes broadened to about 100 nm. When the wavelength band has a width of about 100 nm, the optical fiber transmission line has a large difference in transmission loss between an extremely shorter wavelength and an extremely longer wavelength in the band. Consequently, powers of the component signals arriving at the optical receiver differ largely with one another. The difference can be eliminated nearly completely by using an optical amplifier equipped with a gain equalizer. However, the CWDM optical transmission system must be constructed at a low-cost without using the optical amplifier. Therefore, the CWDM optical transmission system has difficulty in transmitting with high quality all the component signals in the total wavelength band of a signal lightwave.

SUMMARY OF THE INVENTION

An object of the present invention is to offer an optical transmission system suitable for the CWDM optical transmission, particularly an optical transmission system capable of transmitting with high quality all the component signals each having a different wavelength in a broad band. Another object is to offer an optical multiplexer and an optical demultiplexer to be used in the optical transmission system.

According to the present invention, the foregoing object is attained by offering the following optical transmission system for transmitting a signal lightwave comprising a plurality of component signals each having a different wavelength. The optical transmission system comprises:

(a) at least one optical transmitter;
(b) at least one optical receiver;
(c) an optical fiber transmission line that is installed between the at least one optical transmitter and the at least one optical receiver; and
(d) an optical component that:
 (d1) is installed between the at least one optical transmitter and the at least one optical receiver; and
 (d2) gives a loss to the signal lightwave.

The component signals include a component signal having a wavelength of $\lambda_a$ and a component signal having a wavelength of $\lambda_b$. The optical transmission system is designed such that:

(e) the total transmission loss in the optical fiber transmission line is smaller at a wavelength of $\lambda_b$ than at a wavelength of $\lambda_a$
(f) the insertion loss of the optical component is larger at a wavelength of $\lambda_b$ than at a wavelength of $\lambda_a$ and
(g) the difference in power between the component signal having a wavelength of $\lambda_a$ arriving at the at least one optical receiver and the component signal having a wavelength of $\lambda_b$ arriving at the at least one optical receiver is smaller than the difference in the total transmission loss in the optical fiber transmission line between the wavelengths $\lambda_a$ and $\lambda_b$.

The foregoing optical component may be an optical multiplexer, an optical multiplexer, or a variable attenuator. The length of the optical transmission line may be at most 150 km.

According to one aspect of the present invention, the present invention offers the following optical multiplexer for combining a plurality of component signals each having a different center wavelength to constitute a signal lightwave. The optical multiplexer has an insertion loss that increases with increasing center wavelength of the component signals.

According to another aspect of the present invention, the present invention offers the following optical demultiplexer for separating a plurality of component signals each having a different center wavelength from a signal lightwave. The optical demultiplexer has an insertion loss that increases with increasing center wavelength of the component signals.

According to yet another aspect of the present invention, the present invention offers the following optical multiplexer for combining a plurality of component signals each having a different center wavelength to constitute a signal lightwave. The optical multiplexer has an insertion loss-center wavelength property that has a tendency reciprocal to that of the loss-wavelength property of the optical transmission line of the optical transmission system into which the optical multiplexer is incorporated.

According to yet another aspect of the present invention, the present invention offers the following optical demultiplexer for separating a plurality of component signals each having a different center wavelength from a signal lightwave. The optical demultiplexer has an insertion loss-center wavelength property that has a tendency reciprocal to that of the loss-wavelength property of the optical transmission line of the optical transmission system into which the optical demultiplexer is incorporated.

According to yet another aspect of the present invention, the present invention offers the following optical multiplexer for combining a plurality of component signals each having a different center wavelength to constitute a signal lightwave. The optical multiplexer is incorporated into an optical transmission system that comprises an optical demultiplexer and at least one optical receiver. The optical multiplexer has an insertion loss-center wavelength property that has a tendency similar to that of the signal power-center wavelength property of the component signals arriving at the at least one optical receiver when the insertion losses of the optical multiplexer and demultiplexer are excluded.

According to yet another aspect of the present invention, the present invention offers the following optical demultiplexer for separating a plurality of component signals each having a different center wavelength from a signal lightwave. The optical demultiplexer is incorporated into an optical transmission system that comprises an optical multiplexer and at least one optical receiver. The optical demultiplexer has an insertion loss-center wavelength property that has a tendency similar to that of the signal power-center wavelength property of the component signals arriving at the at least one optical receiver when the insertion losses of the optical multiplexer and demultiplexer is excluded.

The present invention is further explained below by referring to the accompanying drawings. The drawings are provided solely for the purpose of illustration and are not intended to limit the scope of the invention.

DETAILED DESCRIPTION OF THE INVENTION

Embodiments of the present invention are explained below by referring to the accompanying drawings. In the drawings, the same number or sign refers to the same element to avoid duplicated explanation. The ratios of the dimensions in the drawings do not necessarily coincide with the explanation.

Figure 1:
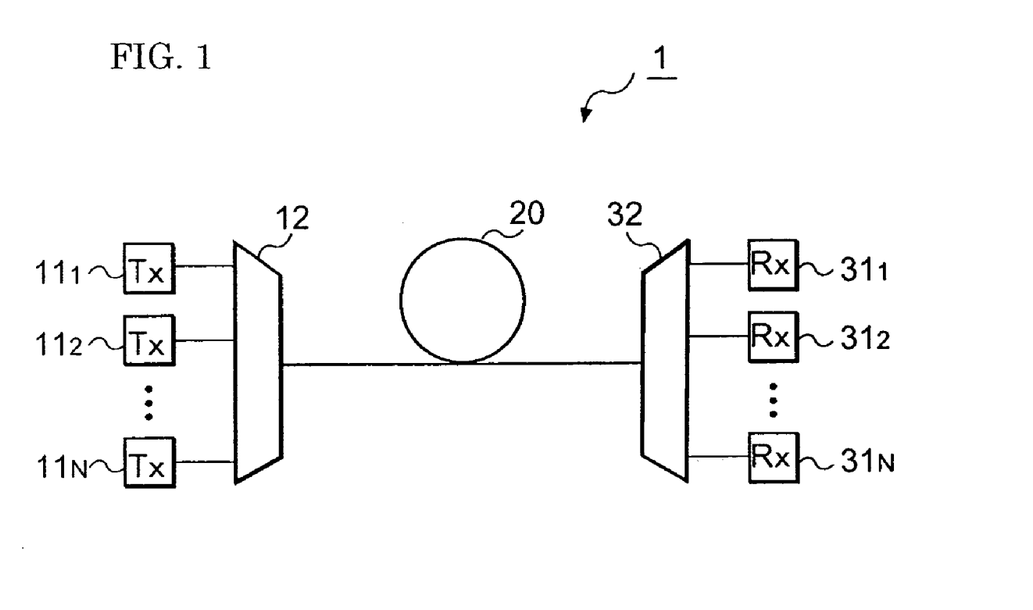
FIG. 1 is a diagram showing the constitution of an optical transmission system 1 in the first embodiment of the optical transmission system of the present invention.

The first embodiment of the optical transmission system of the present invention is explained below by referring to FIG. 1. In FIG. 1, an optical transmission system 1 comprises optical transmitters $11_1$ to $11_N$, an optical multiplexer 12, an optical fiber transmission line 20, an optical demultiplexer 32, and optical receivers $31_1$ to $31_N$. The letter "N" denotes the total number of component signals, optical transmitters, or optical receivers, and is an integer larger than one. No optical amplifier is provided between the optical transmitters $11_1$ to $11_N$ and the optical receivers $31_1$ to $31_N$.

Component signals having mutually different wavelengths of $\lambda_1$ to $\lambda_N$ outputted from the optical transmitters $11_1$ to $11_N$ are combined by the optical multiplexer 12, travel over the optical fiber transmission line 20, and arrive at the optical demultiplexer 32. The combined component signals are separated by the optical demultiplexer 32 according to their wavelengths. The component signal having a wavelength of $\lambda_n$ is received by the optical receiver $31_n$. The suffix "n" indicates n-th in order of an individual component signal, optical transmitter, or optical receiver in the total number N.

In the optical transmission system 1, when the component signal having a wavelength of $\lambda_n$ travels from the optical transmitter $11_n$ to the optical receiver $31_n$, it suffers a loss of $\alpha_n$ (dB), which is expressed by formula (1).

$$\alpha_n = \alpha_{1,n} + \alpha_{2,n} + \alpha_{3,n} \tag{1}$$

where $\alpha_{1,n}$: insertion loss (dB) of the optical multiplexer 12

$\alpha_{2,n}$: total transmission loss (dB) in the optical fiber transmission line 20

$\alpha_{3,n}$: insertion loss (dB) of the optical demultiplexer 32.

When a component signal having a wavelength of $\lambda_n$ is outputted from the optical transmitter $11_n$ and it has a fixed power of $P_0$ (dBm) without regard to its wavelength, the component signal arriving at the optical receiver $31_n$ has a power of $P_n$ (dBm), which is expressed by formula (2).

$$P_n = P_0 - \alpha_n \tag{2}$$

In the optical transmission system 1, the optical fiber transmission line 20 has a length of at most 150 km, which is the maximum transmission length of an practical optical transmission system without an optical fiber amplifier, and the system is designed such that any two wavelengths $\lambda_a$ and $\lambda_b$ in the wavelength range of $\lambda_1$ to $\lambda_N$ produce relationships expressed by formulae (3a) to (3b).

$$\alpha_{2,a} > \alpha_{2,b} \tag{3a}$$

$$\alpha_{1,a} < \alpha_{1,b} \tag{3b}$$

$$\alpha_{3,a} < \alpha_{3,b} \tag{3c}$$

In addition, $\alpha_{2,a}$, $\alpha_{2,b}$, $P_a$, and $P_b$ have a relationship expressed by formula (4).

$$|\alpha_{2,a} - \alpha_{2,b}| > |P_a - P_b| \tag{4}$$

The optical transmission system 1 designed by the above-described manner can transmit all the component signals with high quality even when a signal lightwave has a broad total wavelength band. Therefore, the system is suitable for the CWDM optical transmission.

The system is advantageous in that it has no optical amplifier between the optical transmitters $11_1$ to $11_N$ and the optical receivers $31_1$ to $31_N$, and therefore the power of a signal lightwave decreases monotonously. As a result, the optical transmission system 1 can be constructed at low cost with high reliability.

Any wavelength in the wavelength range of $\lambda_1$ to $\lambda_N$ may be at most 1,520 nm, and any other wavelength may be at least 1,570 nm. Each component signal may have a band width of at least 20 nm. The wavelength spacing of the component signals may be at least 10 nm. As explained above, even when the optical fiber transmission line 20 has a large variation in transmission loss because of the broad total wavelength band of the signal lightwave or because of the wide wavelength spacing of the component signals, the optical transmission system 1 can minimize the variation in the power of the individual component signals arriving at the optical receiver.

It is desirable to transmit the signals at a rate of at most 10 Gb/s. In this case, the optical transmission system 1 can transmit the signal lightwaves with high quality without relying on means for compensating the chromatic dispersion. Consequently, the optical transmission system 1 can be constructed at low cost. It is desirable that the optical fiber transmission line 20 have a transmission loss of at most 0.4 dB/km at a wavelength of 1.38 µm. In this case, a signal lightwave having a wavelength of 1.38 µm or so can also be used.

It is desirable that the optical receivers $31_1$ to $31_N$ comprise an avalanche photodiode. In this case, the increased signal-receiving sensitivity of the optical receivers $31_1$ to $31_N$ can ensure a sufficient margin in the system design and extend the transmission distance of the signal lightwave. It is desirable that the optical receivers $31_1$ to $31_N$ comprise a PIN photodiode. In this case, the optical receivers $31_1$ to $31_N$ can be constructed at low cost, and consequently the construction cost for the optical transmission system 1 can be reduced.

Figure 2A:
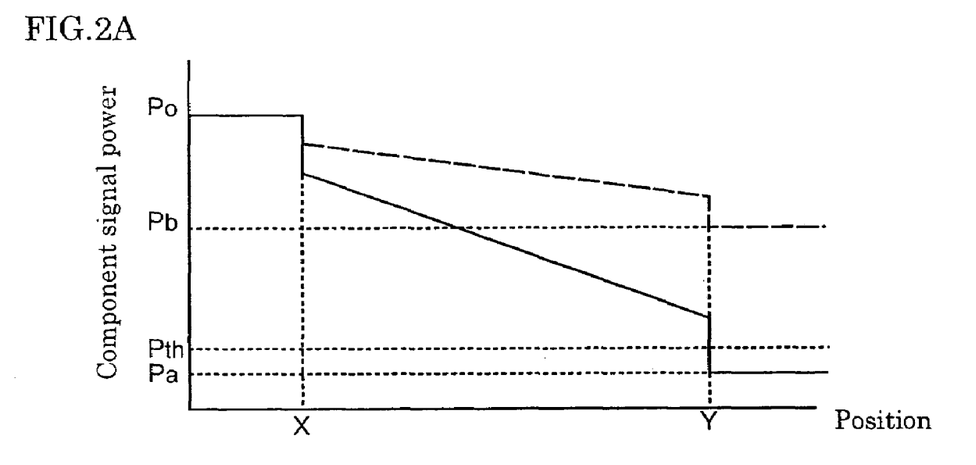
FIGS. 2A and 2B are diagrams showing the transition of the power of individual component signals from the optical transmitter to the optical receiver in the optical transmission system 1.
Figure 2B:
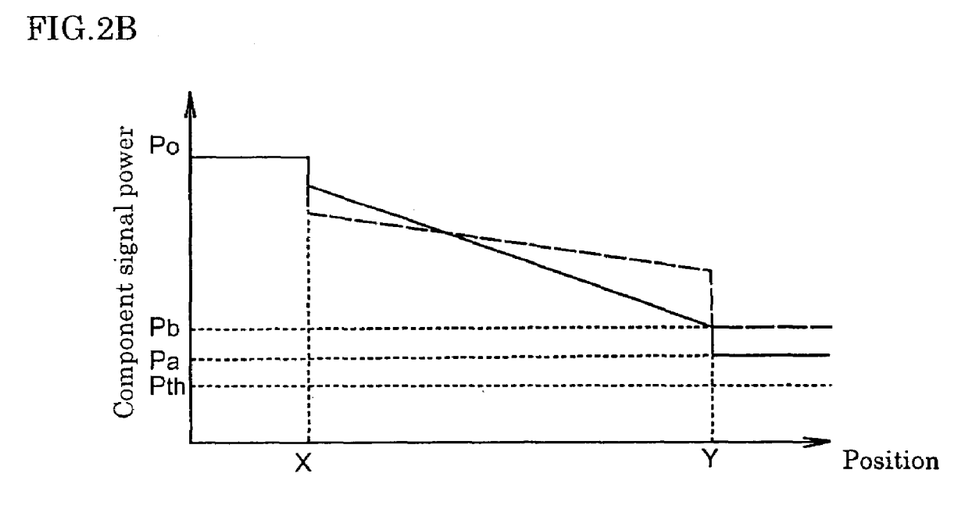

FIGS. 2A and 2B are diagrams showing the transition of the power of a component signal having a wavelength of $\lambda_a$ and another component signal having a wavelength of $\lambda_b$ from the optical transmitter to the optical receiver in an optical transmission system. FIG. 2B is a diagram for the first embodiment. FIG. 2A is a diagram for a comparative example for which the greater-than sign (>) in formula (3a) is unchanged, and the less-than signs (<) in formulae (3b) and (3c) are changed to greater-than signs. In FIGS. 2A and 2B, the solid line shows the transition of the power of a component signal having a wavelength of $\lambda_a$, and the broken line shows that of a component signal having a wavelength of $\lambda_b$.

The component signal having a wavelength of $\lambda_a$ is outputted from an optical transmitter $11_a$ with a power of $P_0$. It suffers a loss of $\alpha_{1,a}$ at a position X where the optical multiplexer is located. It suffers a loss of $\alpha_{2,a}$ in the optical fiber transmission line. It suffers a loss of $\alpha_{3,a}$ at a position Y where the optical demultiplexer is located. It arrives at the optical receiver $31_a$ with a power of $P_a$. Similarly, the component signal having a wavelength of $\lambda_b$ is outputted from an optical transmitter $11_b$ with a power of $P_0$. It suffers a loss of $\alpha_{1,b}$ at a position X. It suffers a loss of $\alpha_{2,b}$ in the optical fiber transmission line. It suffers a loss of $\alpha_{3,b}$ at a position Y. It arrives at the optical receiver $31_b$ with a power of $P_b$.

As can be seen from FIG. 2A for the comparative example, as the signal lightwave travels from the optical transmitter to the optical receiver, the difference in power between the component signal having a wavelength of $\lambda_a$ and the component signal having a wavelength of $\lambda_b$ increases. On the other hand, in FIG. 2B for the first embodiment, as the signal lightwave travels from the optical transmitter toward the optical receiver, the position X produces a difference in power between the component signal having a wavelength of $\lambda_a$ and the component signal having a wavelength of $\lambda_b$. The difference, however, decreases as the signal lightwave travels over the optical fiber transmission line 20. Then, the magnitudes of the power of the two component signals are reversed at some midpoint in the transmission line 20. At the point Y, the difference in the power becomes smaller than the difference between $\alpha_{2,a}$ and $\alpha_{2,b}$. This result satisfies the relationship expressed by formula (4) above.

As described above, the comparative example and the first embodiment perform differently. In the comparative example, the power $P_a$ of the component signal having a wavelength of $\lambda_a$ at the time of the arrival at the optical receiver $31_a$ is smaller than the receiving sensitivity $P_{th}$ of the optical receiver $31_a$. On the other hand, in the first embodiment, the power $P_a$ is larger than the receiving sensitivity $P_{th}$.

The performance difference is explained more specifically in the following example. In this example, both the comparative example and the first embodiment have an optical fiber transmission line comprising a single-mode optical fiber with a zero dispersion wavelength at a wavelength of 1.3 µm or so. The transmission line has a length of 150 km. The signal-transmitting rate is 2.5 Gb/s. Two component signals are transmitted with wavelengths of $\lambda_a$=1.45 µm and $\lambda_b$=1.55 µm. The magnitude of $\alpha_{2,a}$ is 0.26 dB/km, and that of $\alpha_{2,b}$ is 0.20 dB/km. The optical receivers $31_a$ and $31_b$ comprise an avalanche photodiode and have a receiving sensitivity, $P_{th}$, of −34 dBm (BER=$10^{-9}$). The optical transmitters $11_a$ and $11_b$ output the component signals having a power, $P_0$, of 7 dBm.

The comparative example has a feature of $\alpha_{1,a}$=1.5 dB, $\alpha_{1,b}$=0.5 dB, $\alpha_{3,a}$=1.5 dB, and $\alpha_{3,b}$=0.5 dB. In this case, the power $P_a$ of the component signal having a wavelength of $\lambda_a$ becomes −35 dBm when the signal arrives at the optical receiver $31_a$. Similarly, the power $P_b$ becomes −24 dBm. Because of $P_a<P_{th}$, the receiving errors occur frequently. On the other hand, the first embodiment has a feature of $\alpha_{1,a}$=0.5 dB, $\alpha_{1,b}$=1.5 dB, $\alpha_{3,a}$=0.5 dB, and $\alpha_{3,b}$=1.5 dB. In this case, the power $P_a$ becomes −33 dBm, and the power $P_b$ becomes −26 dBm. Because of $P_a>P_{th}$ and $P_b>P_{th}$, the frequency of occurrence of the receiving errors is sufficiently small. As explained above, the first embodiment can transmit with high quality all the component signals each having a different wavelength even when the signal lightwave has a broad total wavelength band. Therefore, it is suitable for the CWDM optical transmission.

Figure 3:
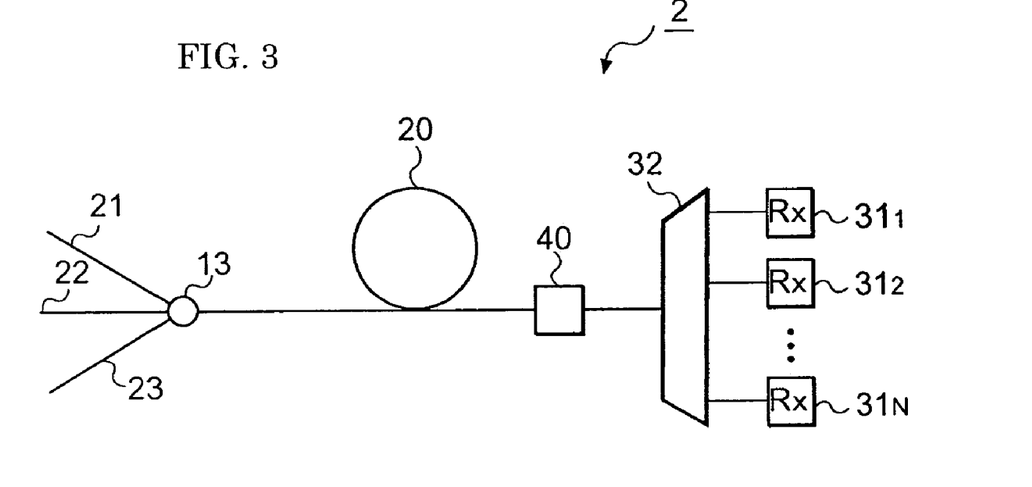
FIG. 3 is a diagram showing the constitution of an optical transmission system 2 in the second embodiment of the optical transmission system of the present invention.

The second embodiment of the optical transmission system of the present invention is explained below by referring to FIG. 3. An optical transmission system 2 comprises optical fiber transmission lines 21 to 23, an optical multiplexer 13, an optical fiber transmission line 20, a variable attenuator 40, an optical demultiplexer 32, and optical receivers $31_1$ to $31_N$, where "N" denotes an integer larger than one. Although not shown in FIG. 3, the optical transmission system 2 further comprises a plurality of optical transmitters connected to the optical fiber transmission lines 21 to 23. An optical network may be structured between the optical transmitters and the optical multiplexer 13. No optical amplifier is provided between the optical transmitters and the optical receivers $31_1$ to $31_N$ to amplify signal lightwaves.

Component signals having mutually different wavelengths of $\lambda_1$ to $\lambda_N$ transmitted over the optical fiber transmission lines 21 to 23 are combined by the optical multiplexer 13. The combined component signals travel over the optical fiber transmission line 20, suffer a loss given by the variable attenuator 40 according to their wavelengths, and arrive at the optical demultiplexer 32. The combined component signals are separated by the optical demultiplexer 32 according to their wavelengths. The component signal having a wavelength of $\lambda_n$ is received by the optical receiver $31_n$. No component signal having a wavelength of $\lambda_n$ outputted from one of the optical transmitters is amplified until it arrives at the optical receiver $31_n$.

In the optical transmission system 2, when the component signal having a wavelength of $\lambda_n$ travels from the optical transmitter to the optical receiver $31_n$, it suffers a loss of $\alpha_n$ (dB), which is expressed by formula (5).

$$\alpha_n = +\alpha_{1,n} + \alpha_{2,n} + \alpha_{3,n} + \alpha_{4,n} \quad (5),$$

where $\alpha_{1,n}$: insertion loss (dB) of the optical multiplexer 13 for a wavelength of $\lambda_n$ $\alpha_{2,n}$: total transmission loss (dB) in one of the optical fiber transmission lines 21 to 23 and the optical fiber transmission line 20 for a wavelength of $\lambda_n$ $\alpha_{3,n}$: insertion loss (dB) of the optical demultiplexer for a wavelength of $\lambda_n$ $\alpha_{4,n}$: insertion loss (dB) of the variable attenuator 40 for a wavelength of $\lambda_n$.

When the component signal with a wavelength of $\lambda_n$ outputted from the optical transmitter has a fixed power of $P_0$ (dBm), the component signal with a wavelength of $\lambda_n$ arriving at the optical receiver $31_n$ has a power of $P_n$ (dBm), which is expressed by formula (2) above.

In the optical transmission system 2, the total length of one of the optical fiber transmission lines 21 to 23 and the optical fiber transmission line 20 is at most 150 km, and the system is designed such that any two wavelengths $\lambda_a$ and $\lambda_b$ in the wavelength range of $\lambda_1$ to $\lambda_N$ produce relationships expressed by formulae (6a) to (6d).

$$\alpha_{2,a} > \alpha_{2,b} \quad (6a).$$

$$\alpha_{1,a} < \alpha_{1,b} \quad (6b).$$

$$\alpha_{3,a} < \alpha_{3,b} \quad (6c).$$

$$\alpha_{4,a} < \alpha_{4,b} \quad (6d).$$

In addition, the difference in power between the component signal with a wavelength $\lambda_a$ arriving at the optical receiver $31_a$ and the component signal with a wavelength $\lambda_b$ arriving at the optical receiver $31_b$ is smaller than the difference in total transmission loss in the optical fiber transmission line 20 between the wavelengths $\lambda_a$ and $\lambda_b$. This condition satisfies the relationship expressed by formula (4) above. The optical transmission system 2 designed by the above-described manner can transmit all the component signals having mutually different wavelengths with high quality even when the signal lightwave has a broad total wavelength band. Therefore, the system is particularly suitable for the CWDM optical transmission.

The system is advantageous in that it has no optical amplifier between the optical transmitters and the optical receivers $31_1$ to $31_N$, and therefore the power of the signal lightwave decreases monotonously. As a result, the optical transmission system 2 can be constructed at low cost with high reliability. Any wavelength in the wavelength range of $\alpha_1$ to $\alpha_1$ may be at most 1,520 nm, and any other wavelength may be at least 1,570 nm. Each component signal may have a band width of at least 20 nm. The wavelength spacing of the component signals may be at least 10 nm. As explained above, even when the optical fiber transmission line 20 has a large variation in transmission loss because of the broad total wavelength band of the signal lightwave or because of the wide wavelength spacing of the component signals, the optical transmission system 2 can minimize the variation in the power of the individual component signals arriving at the optical receiver.

It is desirable to transmit the signals at a rate of at most 10 Gb/s. In this case, the optical transmission system 2 can transmit the signal lightwaves with high quality without relying on means for compensating the chromatic dispersion. Consequently, the optical transmission system 2 can be constructed at low cost. It is desirable that the optical fiber transmission line 20 have a transmission loss of at most 0.4 dB/km at a wavelength of 1.38 μm. In this case, a signal lightwave having a wavelength of 1.38 μm or so can also be used.

It is desirable that the optical receivers $31_1$ to $31_N$ comprise an avalanche photodiode. In this case, the increased signal-receiving sensitivity of the optical receivers $31_1$ to $31_N$ can ensure a sufficient margin in the system design and extend the transmission distance of the signal lightwave. It is desirable that the optical receivers $31_1$ to $31_N$ comprise a PIN photodiode. In this case, the optical receivers $31_1$ to $31_N$ can be constructed at low cost, and consequently the construction cost for the optical transmission system 2 can be reduced.

It is desirable that the variable attenuator 40 be placed at a place posterior to the optical multiplexer 13 and anterior to the optical demultiplexer 32. In this case, the variable attenuator 40 can control the loss of all the component signals (the number of component signals is N). Therefore, the optical transmission system 2 can be constructed at low cost. It is desirable that the variable attenuator 40 have a variable wavelength property. In this case, the variable attenuator 40 can properly respond to a situation in which the transmission loss between the optical transmitters and the optical multiplexer 13 varies with wavelength. Embodiments of the optical multiplexer and the optical demultiplexer of the present invention are explained below. They can be used suitably as the optical multiplexers 12 and 13 and the optical demultiplexer 32 incorporated into the optical transmission systems 1 and 2.

Figure 4A:
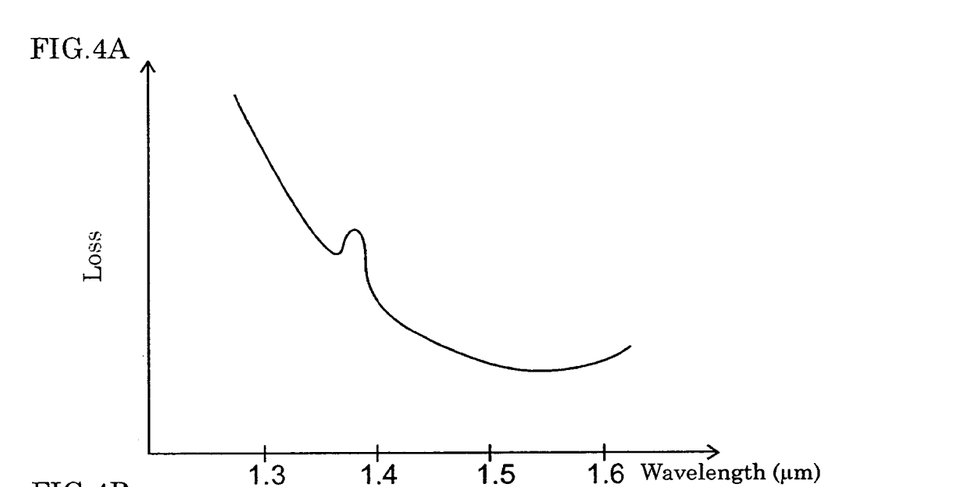
FIGS. 4A to 4D are diagrams illustrating the following properties in the optical transmission system 1: the transmission loss of the optical fiber transmission line, the insertion loss of the optical multiplexer and the optical demultiplexer, and the power of individual component signals arriving at the optical receiver.
Figure 4B:
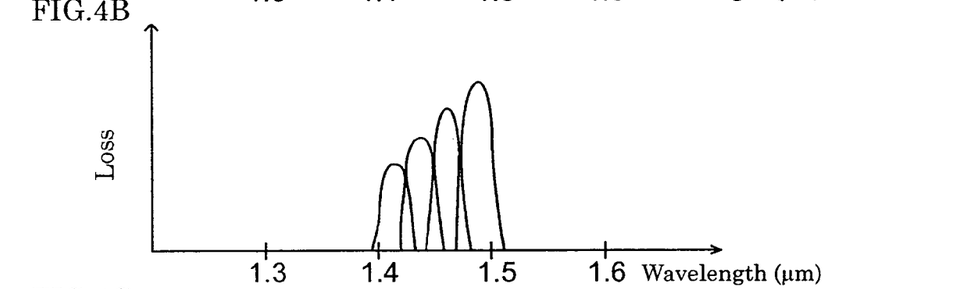
Figure 4C:
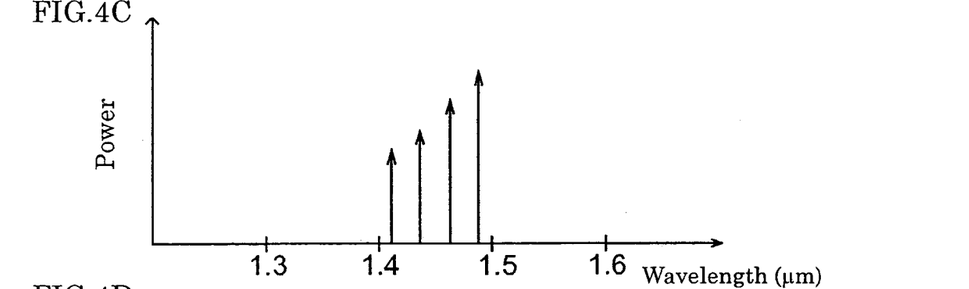
Figure 4D:
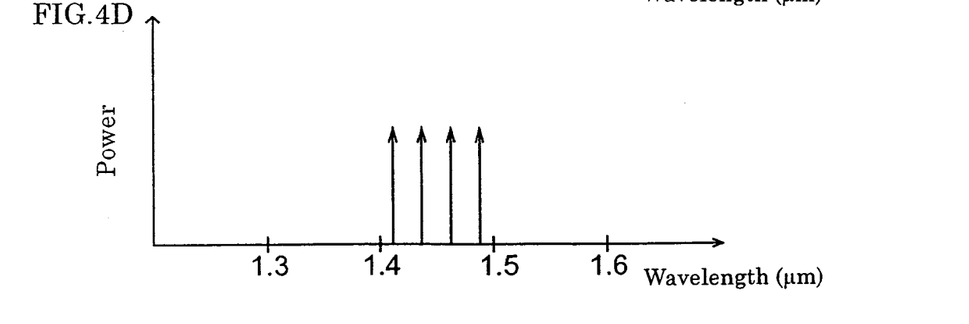

In the following explanation, the optical multiplexer 12 and the optical demultiplexer 32 are used as an example. FIG. 4A shows a wavelength dependence of the transmission loss of the optical fiber transmission line 20. FIG. 4B shows an example of the wavelength dependence of the insertion loss of the optical multiplexer 12 and the optical demultiplexer 32. FIG. 4C shows the power of individual component signals with mutually different wavelengths arriving at the optical receiver when the insertion loss of the optical multiplexer 12 and the optical demultiplexer 32 does not vary with wavelength. FIG. 4D shows the power of individual component signals with mutually different wavelengths arriving at the optical receiver when the insertion loss of the optical multiplexer 12 and the optical demultiplexer 32 varies with wavelength.

As shown in FIG. 4A, the transmission loss of the optical fiber transmission line 20 has a minimum value at a wavelength of 1.55 μm or so. In a wavelength region of less than 1.55 μm, the transmission loss decreases with increasing wavelength. Consequently, when the insertion loss of the optical multiplexer 12 and the optical demultiplexer 32 does not vary with wavelength, the power of component signals arriving at the optical receiver increases with increasing wavelength in a wavelength region of less than 1.55 μm as shown in FIG. 4C.

On the other hand, as shown in FIG. 4B, when the system incorporates the optical multiplexer 12 or the optical demultiplexer 32 whose insertion loss increases as the center wavelength for the multiplexing and demultiplexing increases, the wavelength dependence of the power of the component signals arriving at the optical receiver can be reduced as shown in FIG. 4D. As a result, the system can transmit all the component signals with high quality even when the signal lightwave has a broad total wavelength band. Therefore, the system is suitable for the CWDM optical transmission. Furthermore, the system is advantageous in that it is easy to design, it has superior productivity, it can be constructed at low cost, and it has good applicability as a system.

In addition, when the loss-wavelength property of the optical multiplexer or the optical demultiplexer is designed to compensate or flatten the loss-wavelength property of the optical transmission line or the entire system, additional components can be eliminated and therefore an increase in the system construction cost can be suppressed. Furthermore, the loss budget of the channels at the shorter-wavelength region can be improved, and consequently the reliability of the system can be increased.

It is desirable that the center-wavelength spacing of the component signals to be combined or separated by the optical multiplexer 12 or the optical demultiplexer 32 be at least 10 nm. It is desirable that any of the component signals to be combined or separated have a center wavelength of at most 1,520 nm and any other component signal have a center wavelength of at least 1,570 nm. Alternatively, it is desirable that any of the component signals to be combined or separated have a center wavelength of at most 1,410 nm and any other component signal have a center wavelength of at least 1,570 nm. Yet alternatively, it is desirable that any of the component signals to be combined or separated have a center wavelength of at most 1,310 nm and any other component signal have a center wavelength of at least 1,590 nm. As described above, even when the signal lightwave has a broad total wavelength band or the component signals have a wide center-wavelength spacing, the optical transmission system 2 can reduce the variation in the transmission loss in the optical fiber transmission line over the entire wavelength band of the signal lightwave.

When any of the component signals to be combined or separated has a center wavelength of at most 1,520 nm and any other component signal has a center wavelength of at least 1,570 nm, the transmission loss in the optical fiber transmission line 20 is small and the light source in the optical transmitter is less costly. When any of the component signals to be combined or separated has a center wavelength of at most 1,410 nm and any other component signal has a center wavelength of at least 1,570 nm, the system can effectively utilize the wavelength region that is less susceptible to the direct influence of the OH group-induced loss. When any of the component signals to be combined or separated has a center wavelength of at most 1,310 nm and any other component signal has a center wavelength of at least 1,590 nm, the system can effectively utilize the broadest entire low-loss wavelength region of the optical fiber transmission line 20.

Figure 5:
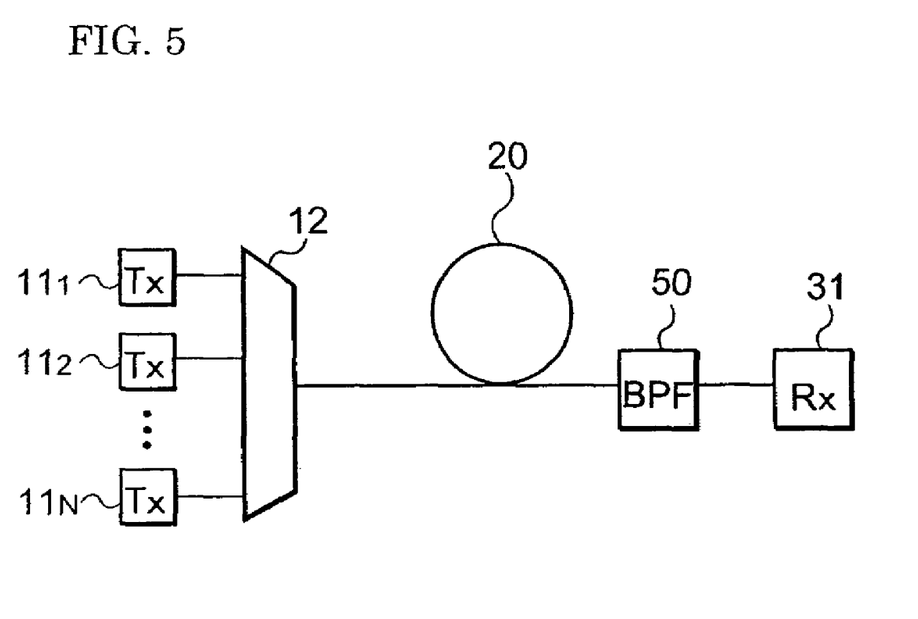
FIG. 5 is a diagram showing the constitution of an optical transmission system in Example 1.

Specific examples are explained below. Example 1 employs an optical transmission system having the structure shown in FIG. 5. As shown in FIG. 5, the component signals (the number of component signals is "N") outputted from optical transmitters $11_1$ to $11_N$ are combined by an optical multiplexer 12 to travel over an optical fiber transmission line 20. They pass through a bandpass filter 50 and arrive at an optical receiver 31. In Example 1, the number of component signals is four. They have a wavelength of 1,510 to 1,570 nm with a spacing of 20 nm. The optical fiber transmission line 20 is composed of a single-mode optical fiber with a length of 50 km.

Table I shows losses of the components such as the optical multiplexer used in Example 1. In the wavelength range of 1,510 to 1,570 nm, the total transmission loss of the optical fiber transmission line 20 has a variation range of 0.9 dB (the term "variation range" is used to mean the difference between the largest and the smallest in a set of numbers). However, this system uses an optical multiplexer 12 whose insertion loss increases with increasing wavelength. As a result, the variation range of the total loss is reduced to 0.2 dB.

TABLE I

| Wavelength (nm) | Loss (dB) (optical fiber) | Loss (dB) (multiplexer) | Loss (dB) (total) |
| --- | --- | --- | --- |
| 1510 | 10.7 | 0.4 | 11.1 |
| 1530 | 10.3 | 0.7 | 11.0 |
| 1550 | 10.0 | 1.0 | 11.0 |
| 1570 | 9.8 | 1.4 | 11.2 |
| Variation range | 0.9 | — | 0.2 |

Example 2 employs an optical transmission system having the structure shown in FIG. 1. In Example 2, the number of component signals is nine. They have a wavelength of 1,410 to 1,570 nm with a spacing of 20 nm. The optical fiber transmission line 20 is composed of a non-zero dispersion-shifted optical fiber with a length of 50 km. Table II shows losses of the components such as the optical multiplexer used in Example 2. In the wavelength range of 1,410 to 1,570 nm, the total transmission loss of the optical fiber transmission line 20 has a variation range of 3.7 dB. However, this system uses an optical multiplexer 12 and an optical demultiplexer 32 whose insertion losses increase with increasing wavelength. As a result, the variation range of the total loss is reduced to 1.6 dB.

TABLE II

| Wavelength (nm) | Loss (dB) (optical fiber) | Loss (dB) (multiplexer) | Loss (dB) (demultiplexer) | Loss (dB) (total) |
| --- | --- | --- | --- | --- |
| 1410 | 13.2 | 0.3 | 0.3 | 13.8 |
| 1430 | 12.3 | 0.7 | 0.7 | 13.7 |
| 1450 | 11.6 | 1.1 | 1.2 | 13.9 |
| 1470 | 11.0 | 1.4 | 1.5 | 13.9 |
| 1490 | 10.5 | 1.7 | 1.9 | 14.1 |
| 1510 | 10.1 | 1.9 | 2.3 | 14.3 |
| 1530 | 9.8 | 2.1 | 2.7 | 14.6 |
| 1550 | 9.6 | 2.3 | 3.0 | 14.9 |
| 1570 | 9.5 | 2.5 | 3.3 | 15.3 |
| Variation range | 3.7 | — | — | 1.6 |

Example 3 employs an optical transmission system having the structure shown in FIG. 1. In Example 3, the number of component signals is 16. They have a wavelength of 1,310 to 1,610 nm with a spacing of 20 nm. The optical fiber transmission line 20 is composed of a single-mode optical fiber with a length of 100 km. The optical fiber has a suppressed OH group-induced loss at a wavelength of 1.38 µm. Table III shows losses of the components such as the optical multiplexer used in Example 3. In the wavelength range of 1,310 to 1,610 nm, the total transmission loss of the optical fiber transmission line 20 has a variation range of 14.2 dB. However, the use of the optical multiplexer 12 and the optical demultiplexer 32 reduces the variation range of the total loss to 6.3 dB. In this case, the loss-wavelength property of the optical multiplexer 12 and the optical demultiplexer 32 is adjusted in accordance with that of the total transmission loss of the optical fiber transmission line 20. This adjusting method can further reduce the variation range of the total loss in comparison with the case where the insertion loss varies monotonously with wavelength

TABLE III

| Wavelength (nm) | Loss (dB) (optical fiber) | Loss (dB) (multi-plexer) | Loss (dB) (demulti-plexer) | Loss (dB) (total) |
|---|---|---|---|---|
| 1310 | 33.1 | 0.3 | 0.3 | 33.7 |
| 1330 | 31.4 | 0.6 | 0.8 | 32.8 |
| 1350 | 29.9 | 0.9 | 1.2 | 32.0 |
| 1370 | 29.2 | 1.2 | 1.6 | 31.9 |
| 1390 | 28.8 | 1.5 | 2.0 | 32.3 |
| 1410 | 26.4 | 1.9 | 2.4 | 30.7 |
| 1430 | 24.7 | 2.2 | 2.7 | 29.6 |
| 1450 | 23.2 | 2.5 | 2.9 | 28.6 |
| 1470 | 22.1 | 2.8 | 3.2 | 28.1 |
| 1490 | 21.1 | 3.1 | 3.6 | 27.8 |
| 1510 | 20.2 | 3.3 | 3.9 | 27.4 |
| 1530 | 19.6 | 3.7 | 4.3 | 27.5 |
| 1550 | 19.2 | 4.0 | 4.6 | 27.8 |
| 1570 | 18.9 | 4.5 | 5.1 | 28.5 |
| 1590 | 19.1 | 4.3 | 4.9 | 28.3 |
| 1610 | 19.8 | 3.5 | 4.1 | 27.4 |
| Variation range | 14.2 | — | — | 6.3 |

Example 4 employs an optical transmission system having the structure shown in FIG. 5. In Example 4, the number of component signals is six. They have a wavelength of 1,510 to 1,560 nm with a spacing of 10 nm. The optical fiber transmission line 20 is composed of a dispersion-shifted optical fiber with a length of 50 km. Example 4 uses an optical multiplexer 12 whose insertion loss increases with increasing wavelength. Its comparative example uses an optical multiplexer whose insertion loss varies randomly without regard to wavelength. Table IV shows losses of the components such as the optical multiplexer used in Example 4 and the comparative example. In the wavelength range of 1,510 to 1,560 nm, the total transmission loss of the optical fiber transmission line 20 has a variation range of 0.55 dB. In the comparative example, which uses an optical multiplexer whose insertion loss varies randomly without regard to wavelength, the variation range of the total loss increase to 1.4 dB. On the other hand, in Example 4, which uses the optical multiplexer 12 whose insertion loss increases with increasing wavelength, the variation range of the total loss is 1.1 dB.

TABLE IV

| Wave-length (nm) | Loss (dB) (optical fiber) | Example 4 | | Comparative example | |
|---|---|---|---|---|---|
| | | Loss (dB) (multi-plexer) | Loss (dB) (total) | Loss (dB) (multi-plexer) | Loss (dB) (total) |
| 1510 | 10.08 | 0.32 | 10.4 | 0.62 | 10.7 |
| 1520 | 9.93 | 0.64 | 10.6 | 0.91 | 10.8 |
| 1530 | 9.77 | 1.02 | 10.8 | 0.3 | 10.1 |
| 1540 | 9.69 | 1.32 | 11.0 | 1.18 | 10.9 |
| 1550 | 9.60 | 1.70 | 11.3 | 1.92 | 11.5 |
| 1560 | 9.53 | 1.98 | 11.5 | 1.46 | 11.1 |
| Variation range | 0.55 | — | 1.1 | — | 1.4 |

Example 5 employs an optical transmission system having the structure shown in FIG. 5. In Example 5, the number of component signals is six. They have a wavelength of 1,520 to 1,545 nm with a spacing of 5 nm. The optical fiber transmission line 20 is composed of a dispersion-shifted optical fiber with a length of 50 km. Example 5 uses an optical multiplexer 12 whose insertion loss increases with increasing wavelength. Its comparative example uses an optical multiplexer whose insertion loss varies randomly without regard to wavelength. Table V shows losses of the components such as the optical multiplexer used in Example 5 and the comparative example. In the wavelength range of 1,520 to 1,545 nm, the total transmission loss of the optical fiber transmission line 20 has a variation range of 0.29 dB. In the comparative example, which uses an optical multiplexer whose insertion loss varies randomly without regard to wavelength, the variation range of the total loss increases to 1.4 dB. In Example 5, which uses the optical multiplexer 12 whose insertion loss increases with increasing wavelength, the variation range of the total loss is also 1.4 dB. In Example 5, the component signals have a narrow wavelength spacing. In such a case, the wavelength dependence of the transmission loss of the optical fiber transmission line 20 is much smaller than that of the insertion loss of the optical multiplexer in many instances. The same can be said in Example 5 as shown in Table V. As a result, Example 5 and the comparative example have a similar variation range of the total loss.

TABLE V

| Wave-length (nm) | Loss (dB) (optical fiber) | Example 5 | | Comparative example | |
|---|---|---|---|---|---|
| | | Loss (dB) (multi-plexer) | Loss (dB) (total) | Loss (dB) (multi-plexer) | Loss (dB) (total) |
| 1520 | 9.93 | 0.28 | 10.2 | 0.66 | 10.6 |
| 1525 | 9.85 | 0.54 | 10.4 | 0.93 | 10.8 |
| 1530 | 9.77 | 0.92 | 10.7 | 0.38 | 10.2 |
| 1535 | 9.73 | 1.34 | 11.1 | 1.55 | 11.3 |
| 1540 | 9.69 | 1.72 | 11.4 | 1.95 | 11.6 |
| 1545 | 9.64 | 1.97 | 11.6 | 1.20 | 10.8 |
| Variation range | 0.29 | — | 1.4 | — | 1.4 |

The entire disclosure of Japanese patent application 2002-309852 filed on Oct. 24, 2002 including the specification, claims, drawings, and summary is incorporated herein by reference in its entirety.

What is claimed is:

1. An optical transmission system for transmitting a signal lightwave comprising a plurality of component signals each having a different wavelength, the optical transmission system comprising:
   (a) at least one optical transmitter;
   (b) at least one optical receiver;
   (c) an optical fiber transmission line that:
      (c1) is installed between the at least one optical transmitter and the at least one optical receiver; and
      (c2) has a length of at most 150 km; and
   (d) an optical component that:
      (d1) is installed between the at least one optical transmitter and the at least one optical receiver; and
      (d2) gives a loss to the signal lightwave;
   the component signals including a component signal having a wavelength of $\lambda_a$ and a component signal having a wavelength of $\lambda_b$;
   the optical transmission system being designed such that:
   (e) the total transmission loss in the optical fiber transmission line is smaller at a wavelength of $\lambda_b$ than at a wavelength of $\lambda_a$;

(f) the insertion loss of the optical component is larger at a wavelength of $\lambda_b$ than at a wavelength of $\lambda_a$; and (g) the difference in power between the component signal having a wavelength of $\lambda_a$ arriving at the at least one optical receiver and the component signal having a wavelength of $\lambda_b$ arriving at the at least one optical receiver is smaller than the difference in the total transmission loss in the optical fiber transmission line between the wavelengths $\lambda_a$ and $\lambda_b$.

2. An optical transmission system as defined by claim 1, wherein the power of the signal lightwave decreases monotonously form the at least one optical transmitter to the at least one optical receiver.

3. An optical transmission system as defined by claim 1, wherein any of the component signals has a wavelength of at most 1,520 nm and any other of the component signals has a wavelength of at least 1,570 nm.

4. An optical transmission system as defined by claim 1, wherein each of the component signals has a bandwidth of at least 20 nm.

5. An optical transmission system as defined by claim 1, wherein the component signals have a wavelength spacing of at least 10 nm.

6. An optical transmission system as defined by claim 1, wherein the optical fiber transmission line has a transmission loss of at most 0.4 dB/km at a wave-length of 1.38 µm.

7. An optical transmission system as defined by claim 1, wherein the at least one optical receiver comprises an avalanche photodiode.

8. An optical transmission system as defined by claim 1, wherein the at least one optical receiver comprises a PIN photodiode.

9. An optical transmission system as defined by claim 1, wherein the optical component is a member of the group consisting of an optical multiplexer for combining the component signals and an optical demultiplexer for separating the component signals.

10. An optical transmission system as defined by claim 1, wherein the optical component is a variable attenuator.

11. An optical transmission system as defined by claim 10, the optical transmission system further comprising:

(a) an optical multiplexer for combining the component signals; and (b) an optical demultiplexer for separating the component signals; the variable attenuator being installed at a place selected from the group consisting of a place posterior to the optical multiplexer and a place anterior to the optical demultiplexer.

12. An optical transmission system as defined by claim 10, wherein the variable attenuator has a variable loss-wavelength dependence.

13. An optical transmission system for transmitting a signal lightwave comprising a plurality of component signals each having a different wavelength, the optical transmission system comprising:

(a) at least one optical transmitter;

(b) at least one optical receiver;

(c) an optical fiber transmission line that is installed between the at least one optical transmitter and the at least one optical receiver; and (d) an optical component that:

(d1) is installed between the at least one optical transmitter and the at least one optical receiver; and (d2) gives a loss to the signal lightwave;

the component signals including a component signal having a wavelength of $\lambda_a$ and a component signal having a wavelength of $\lambda_b$;

the optical transmission system being designed such that:

(e) the total transmission loss in the optical fiber transmission line is smaller at a wavelength of $\lambda_b$ than at a wavelength of $\lambda_a$;

(f) the insertion loss of the optical component is larger at a wavelength of $\lambda_b$ than at a wavelength of $\lambda_a$; and (g) the difference in power between the component signal having a wavelength of $\lambda_a$ arriving at the at least one optical receiver and the component signal having a wavelength of $\lambda_b$ arriving at the at least one optical receiver is smaller than the difference in the total transmission loss in the optical fiber transmission line between the wavelengths $\lambda_a$ and $\lambda_b$.

* * * * *